Patented Jan. 8, 1929.

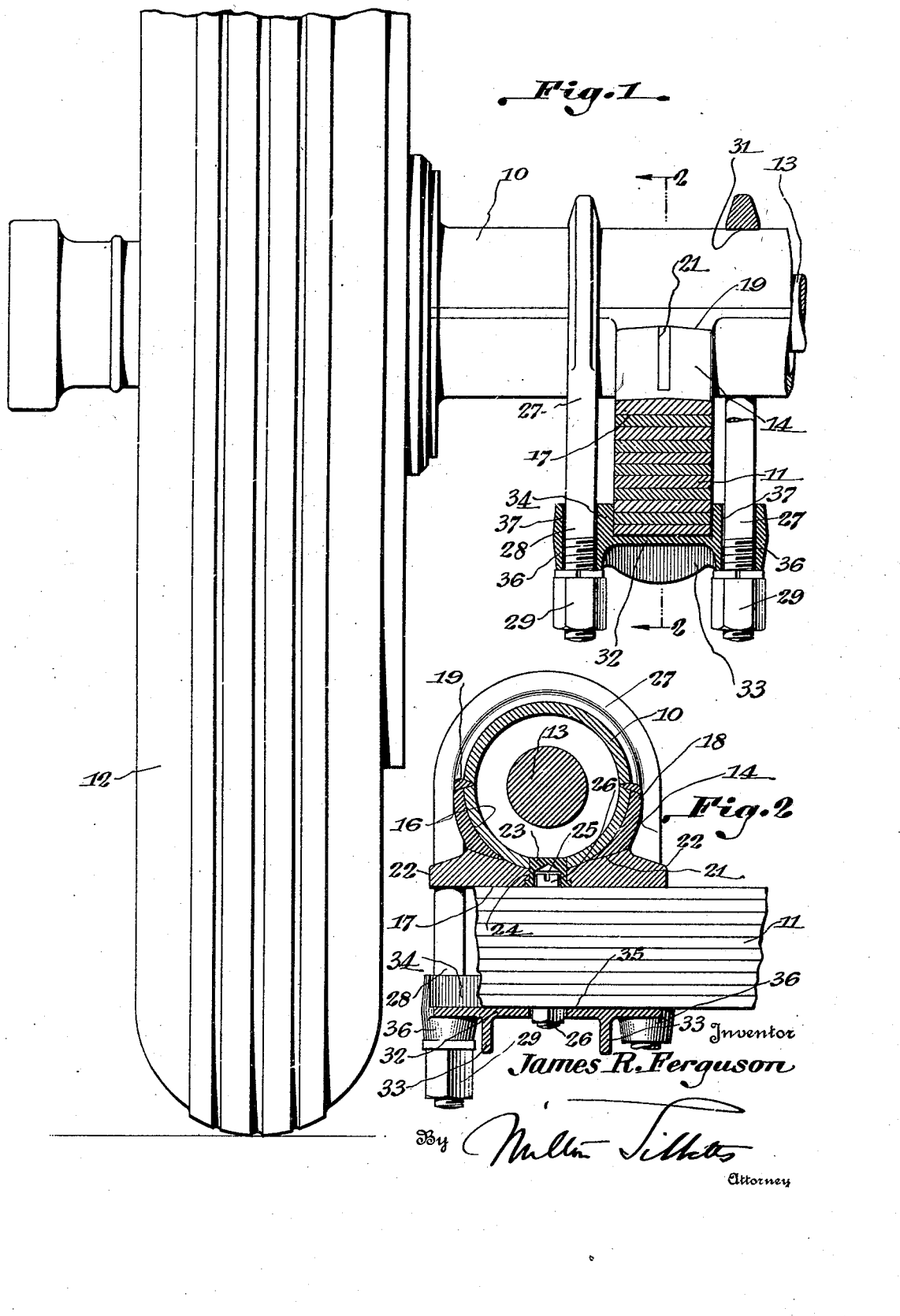

1,698,052

UNITED STATES PATENT OFFICE.

JAMES R. FERGUSON, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed November 11, 1925. Serial No. 68,284.

This invention relates to motor vehicles, particularly to the spring mounting thereof and it has for one of its objects to provide means for attaching rear springs of a vehicle to the rear axle thereof in which the stresses shall be more evenly distributed and the danger of failure thereby minimized.

Another object of the invention is to provide a spring seat for the axle of a motor vehicle which shall be secured below the axle to position an under-slung spring and which shall be rigidly secured against turning on the axle.

Another object of the invention is to provide a suspension for such springs which shall be rigidly clamped to the axle.

Other objects of the invention will appear from the following description taken in connection with the drawings, which form a part of this specification and in which:

Fig. 1 is a view, partially in front elevation and partially in section, of a portion of the driving wheel and axle of a motor vehicle showing the application of the invention thereto, and, Fig. 2 is a view in section substantially on the line 2—2 of Fig. 1.

It has heretofore been the practice in the spring suspension of motor vehicles to clamp the vehicle spring between a seat formed on the axle and a clamping plate, by means of U-bolts adapted to embrace the axle and to draw the plate into clamping engagement with the spring. U-bolts of round section, such as have been heretofore used, permit a certain amount of spring twist by reason of the fact they make only a line engagement with the axle, thus setting up unevenly distributed stresses, and frequently causing failure of the parts. In the present invention the suspension is adapted to engage the axle through a surface by which the stresses are more evenly distributed in the suspension members and which prevents twisting or other mis-alignment of the springs.

Referring to the drawings, at 10 is shown a portion of the rear axle of a motor vehicle which constitutes a support or bridge on which the chassis frame (not shown) is mounted in the usual manner through suitable vehicle springs 11. The axle 10 is supported by the usual vehicle wheels equipped with tires 12, which wheels are driven by axle shafts 13 enclosed in the axle 10. This axle 10 is usually tubular at the end portion thereof and is provided on its lower surface near the vehicle wheel with a spring seat 14 to which the springs 11 are secured.

The spring seat 14 is conveniently formed with a semi-cylindrical upper surface 16, adapted to cooperate with the axle 10, and with a plane horizontal lower surface 17 against which the spring 11 is clamped. The extremities 18 of the curved upper portion of the seat member 11 are preferably welded to the axle 10 as shown at 19, and the seat 14 may be provided in its central plane with a longitudinally disposed slot 21, the edges of which may be also be welded to the axle if desired. The lower portion of the spring seat 14 is provided with forwardly and rearwardly extending portions 22, arranged longitudinally of the spring 11.

To prevent creeping of the spring seat about the axle 10 and to relieve the welded portions 19 of excessive stress, a dowel 23 is preferably mounted in a hole 24 formed in the spring seat 14 and extending into the axle, which dowel is provided with a recess 25 in its lower face to receive the head of the usual spring leaf retaining bolt 26.

Mounted to embrace the axle 10 is a pair of spaced U-bolts 27, having downwardly extending leg portions 28, threaded to receive nuts 29. The upper portions of the U-bolts 27 are flattened as indicated at 31, to increase the bearing surface on the axle 10, and they extend forwardly and rearwardly of the axle 10, one of them being disposed on each side of the spring 11.

Cooperating with the leg portions of the U-bolts 27 is a clamping plate 32, provided with suitable stiffening ribs 33 and having a depressed central portion forming spring retaining ledges 34 on the upper face, and a centrally disposed clearance aperture 35 for the nut of the bolt 26. This plate 32 is adapted to engage the central portion of the spring 11, the ledges 34 being disposed on either side thereof, and it is provided on its lower face with suitable lugs 36 in which are formed apertures 37, adapted to cooperate with the terminal portions 28 of the U-bolts 27. The plate 32 is urged upwardly by means of the nuts 29 so as to rigidly clamp the spring 11 between its seat 14 and the plate, in a manner well known in the art to which this invention relates.

It will be evident that by this construction is provided a sturdy and reliable spring suspension for the rear axles of motor vehicles. The suspension members or bolts 27, by reason of their flattened surfaces 31, are adapted to closely embrace the axle 10 in such a manner that, not only is the contact distributed over the area of this surface but twisting forces in the spring 11 are rigidly resisted.

It will also be seen that the spring seat 14 is rigidly clamped by means of the bolts 27 and the plate 32 between the axle 10 and the spring, so that all torsional loads on the axle 10 are transmitted directly into the spring seat and by it through the springs 11 to the vehicle frame.

It will be understood that various forms of the invention other than those described above may be used without departing from the spirit or scope of the invention.

What is claimed and desired to be secured by Letters Patent is:

1. The combination in a motor vehicle comprising an axle and springs, of a spring seat having a saddle to receive the axle, a dowel securing the seat to the axle, said dowel having a recess adapted to receive the head of the center bolt of the spring, a clamping plate, and U-bolts to clamp the spring between said seat and said plate.

2. The combination in a motor vehicle comprising a tubular axle and a spring, of a spring seat having an upwardly disposed semi-cylindrical surface secured below said axle and a downwardly disposed plane surface, a recessed shoulder dowel securing said axle and seat together, U-shaped members embracing the upper half of said axle on either side of said seat each having threaded leg portions forwardly and rearwardly of the axle, a clamping plate having apertures for the reception of said leg portions, and nuts on said portions for clamping the spring between the plane surface of the seat and said plate with the center bolt of the spring engaging the recess in the dowel.

3. The combination in a motor vehicle comprising an axle and a spring, of a spring seat having a shouldered aperture, a shouldered dowel fitted into said aperture and provided with an axial recess adapted to receive the center bolt of the spring and means for securing the spring against the seat.

In testimony whereof I affix my signature.

JAMES R. FERGUSON.